Jan. 3, 1961   C. M. PERKINS   2,966,886
ANIMAL WATERER

Filed June 12, 1959   2 Sheets-Sheet 1

INVENTOR.
CHARLES M. PERKINS
BY
Robert K. Youtie
ATTORNEY

United States Patent Office 2,966,886
Patented Jan. 3, 1961

2,966,886

ANIMAL WATERER

Charles M. Perkins, Albion, Ill.
(P.O. Box 7709, Philadelphia 1, Pa.)

Filed June 12, 1959, Ser. No. 820,004

7 Claims. (Cl. 119—71)

This invention relates generally to animal watering devices, and is especially concerned with a novel animal watering device which is entirely automatic in that it is operable by the animals desiring to receive water.

As is well known to those versed in the art, conventional watering devices are necessarily of relatively great size and complexity, which is undesirable for many reasons, including that of undue initial and continuing costs, as well as unreliability under actual operating conditions. In addition, existing livestock watering devices are extremely difficult to heat and prevent freezing, as well as to keep clean and free of food and dirt, especially that coming from the animals.

Accordingly, it is an object of the present invention to provide an animal watering device which overcomes the above mentioned difficulties, is extremely simple and compact in construction so as to occupy a minimum of space and be entirely reliable under all conditions of operation.

It is another object of the present invention to provide an animal watering device having the advantageous characteristics mentioned in the preceding paragraph which is sanitary and safe, requiring a minimum of maintenance and care, especially since food and dirt are effectively prevented from entering the device.

A more particular object of the present invention is to provide an animal watering device of the type described which is readily adapted for heating, to prevent freezing in low temperature weather, and which operates entirely automatically under ordinary water pressures.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
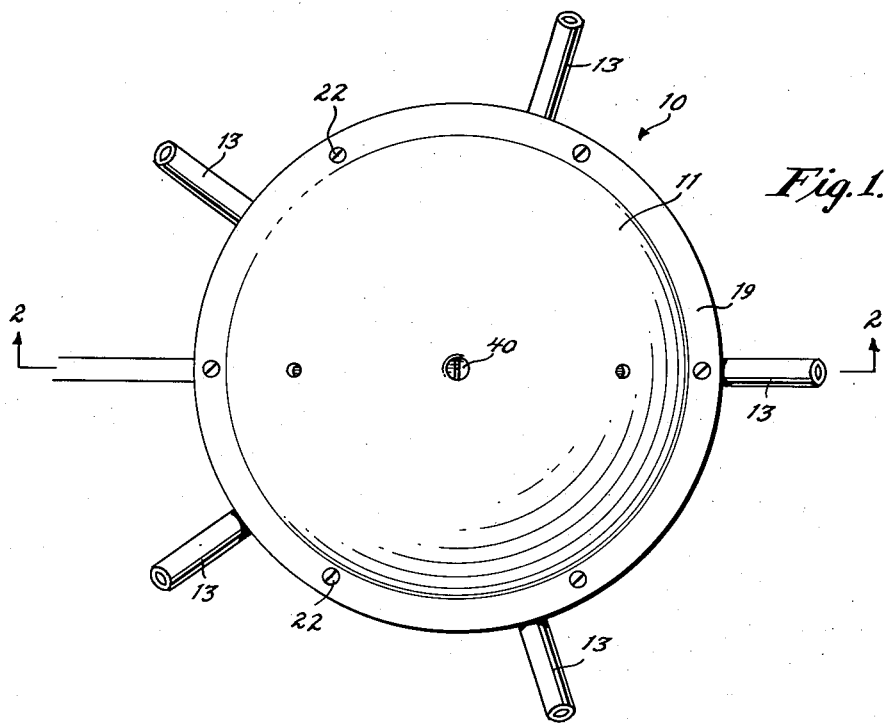
Figure 1 is a top plan view showing an animal watering device constructed in accordance with the teachings of the present invention.
Figure 2:
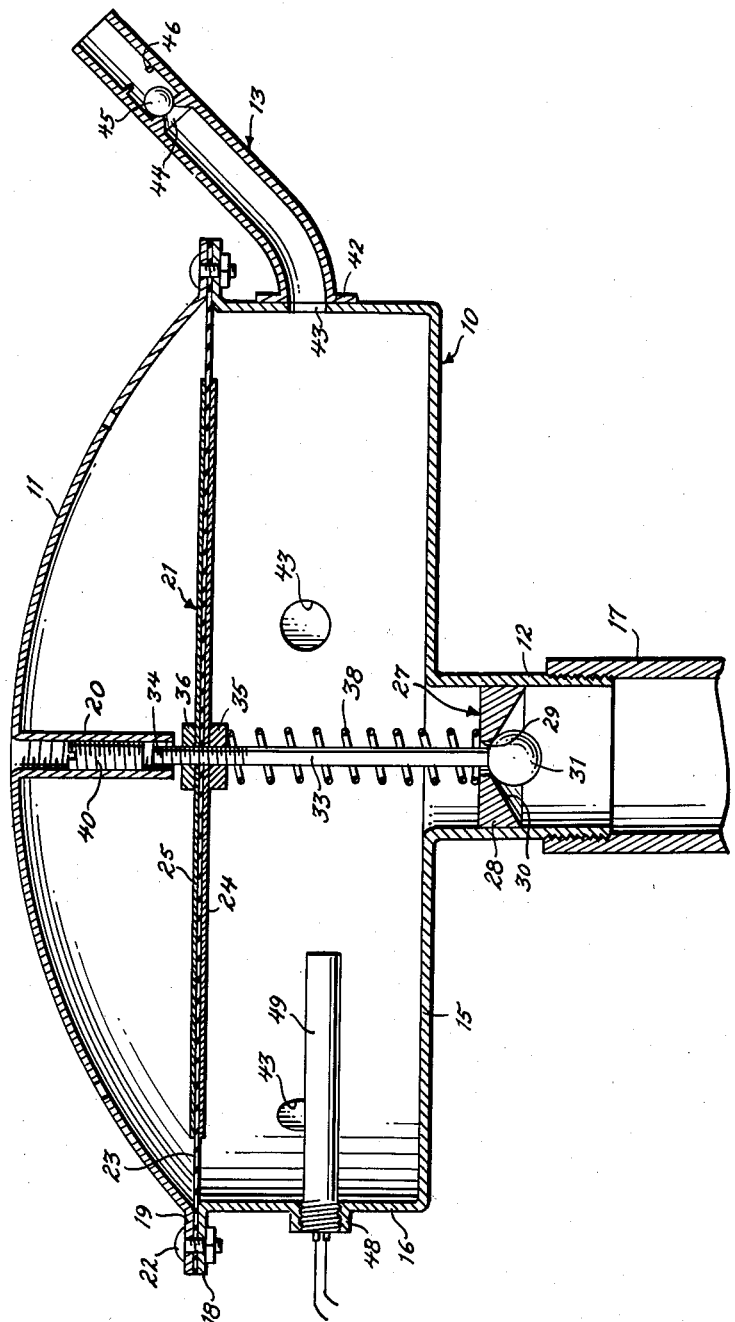
Figure 2 is a sectional elevational view taken substantially along the line 2—2 of Figure 1.

Referring now more particularly to the drawings, and specifically to Figures 1 and 2 thereof, the watering device includes a chamber, generally designated 10, which may have a cover 11 on its upper side, and be provided on its under side with an inlet nipple 12. At spaced points about the chamber or vessel 10 there may be provided one or more outlet nipple 13.

The chamber 10 may be generally cylindrical in configuration, having a generally circular bottom wall 15 and an upstanding peripherally extending side wall 16. Centrally of the bottom wall may be provided a depending nipple defining the inlet 12 and secured at its lower end to a water supply pipe 17.

Extending peripherally about the upper edge of the side wall 16 is an outstanding flange 18 which supports the cover 11. The cover may be of a dome shaped configuration having a peripheral outstanding flange 19 superposed over the flange 18, and may be provided centrally with an internally threaded tube 20 depending interiorly of the cover. The upper wall of the vessel may be defined by a diaphragm generally designated 21 which has its peripheral margin sandwiched between the flanges 18 and 19 and firmly secured therebetween by fasteners 22 extending through the flanges.

The diaphragm 21 may include an intermediate layer 23 of flexible sheet material, such as rubber, plastic or the like, which has its central portion interposed between a pair of generally circular, relatively rigid discs or plates 24 and 25. That is, the plates 24 and 25 are respectively disposed in facing engagement with the under and upper surfaces of the intermediate flexible sheet 23; and, the plates are of a diameter less than that of the sheet so as to terminate at their peripheral edge short of the wall 16, while the sheet extends beyond the latter wall into the above described securement between flanges 18 and 19. Thus, it will now be appreciated that the diaphragm 21 defines the upper wall of the vessel 10 and is movable inwardly and outwardly, toward and away from the vessel wall 15.

Valve means, generally designated 27, is provided in the liquid inlet 12 of the vessel 10, and includes a generally annular valve seat 28 extending entirely across the water inlet and having a central port 29. The under or outer surface 30 of the valve seat 28 may be dished, or concavely conical, if desired. Movable into and out of closing relation with respect to the valve seat 28, seated on the undersurface 30, is a valve element 31, which may have a generally spherical configuration.

Means for operating the valve 27 includes an elongate rod or stem 33 having one end fixedly secured to the valve element 31 and extending therefrom upward spacedly through the port 29. The valve stem 33 continues generally vertically upward centrally through the plate 24, sheet 23 and plate 25 of the diaphragm 21, and has its upper end region 34 extending upward beyond the diaphragm. The upper end region 34 of the valve operator or stem 33 is preferably externally threaded, as illustrated; and, retaining nuts 35 and 36 are threadedly engaged on the valve stem in respective bearing engagement with the undersurface of the diaphragm plate 24, and the upper surface of the diaphragm plate 25 to firmly clamp the diaphragm between the plates.

Resilient means, say in the form of a coil compression spring 38 circumposed about the valve operator 33, may serve to resiliently bias the diaphragm upward or outward, while urging the valve element 31 into its closed, seated engagement with the valve seat 28. That is, the spring 38, being under compression, bears at its opposite ends against the fixed valve seat and the nut 35 to resiliently urge the diaphragm 21 and stem 33 upward. The upper terminal region of the valve stem 33 projects in spaced relation into the lower end of the depending tube 20 which is fixed to the cover 11. That is, the lower end of the tube 20 is spaced vertically above the diaphragm 21, and the upper nut 36, so as not to restrain movement of the diaphragm. However, the stem 33 has its distal upper end portion spacedly received in the lower region of the tube 20. Threadedly engaged in the tube 20 is a stop member or plug 40 which is illustrated having its lower end proximate to the upper end of the stem 33, for a purpose appearing presently.

At circumferentially spaced locations about the peripheral side wall 16 of the vessel 10 are arranged a plurality of the suction tubes or nipples 13. Each of the nipples may be provided on its lower end with an outstanding flange 42 welded or otherwise fixed to the vessel side walls 16 in registry with a side wall opening 43. From its registry with the adjacent opening 43, each outlet nipple or tube 13 extends obliquely upward to a level appreciably beyond that of the vessel top wall or diaphragm 21. Interiorly of each outlet tube or nipple 13, at a level above that of the diaphragm 21, is an internal valve seat 44; and, a freely movable valve element, say in the form of a ball 45, rests on and closes the valve seat 44. Internal projections 46, or other abutment means are provided in each nipple 13 above the valve element 45 to retain the latter in the respective nipple while permitting its seating and unseating movement toward and away from the adjacent valve seat 44. Thus, the seat 44 and valve element 45 combine to define a one-way or check valve in each of the outlet nipples 13, permitting egress therefrom and preventing ingress therethrough.

If desired, an additional, preferably internally threaded hole or opening 48 may be provided in the vessel side wall 16 for removably receiving a conventional heating element 49 projecting into the interior of the vessel. The heating element 49 may be of an electrical type, and may be removed, when desired, and replaced by a closure plug (not shown).

In operation, the interior of the vessel 10 is normally filled with water, and the valve element 31 in closed seating engagement with the valve seat 28. Upon the application of suction to one or more of the nipples 13, as by an animal sucking the open upper end thereof, the valve element 45 is unseated to open the check valve 44, 45 and draw water upward into the animal's mouth. This reduces pressure interiorly of the vessel 10, so that the pressure on the inner side of the diaphragm 21 is decreased relative to the atmospheric pressure on the outer side thereof. The diaphragm is thereby caused to move downward or inward, the resisting force of spring 38 being relatively small, to effect opening movement of the valve element 31 by means of the operator or stem 33, and thereby permit the admission of additional water from the supply pipe 17 through the inlet port 29 to the interior of the vessel 10. This replenishes the water supply within the vessel, and raises the pressure therein until it is sufficient to move the diaphragm upward or outward against atmospheric pressure together with the assistance of the spring 38, to close the valve 31 when the vessel 10 is full.

If it is desired, say in the training of animals to use the watering device, to permit a small rate of water leakage from the nipples 13, this may be accomplished by adjusting the stop screw 40 downward in its threaded engagement with the tube 20 to bear against the upper end of the stem 33 and prevent full closing movement of the latter. In this case, the application of suction to one of the nipples 13 would operate in the same manner as described hereinbefore, to provide a greater rate of flow of liquid, so that the animal would very soon learn to suck in order to obtain water.

The check valves 44, 45 serve to permit the creation of decreased pressure in the vessel 10 by the application of suction to one of the nipples for the above described resulting operation, and further serve to effectively prevent the entry of food particles and dirt into the vessel, any such food particles or dirt entering the upper end of a nipple being quickly withdrawn by the animal.

Figure 3:
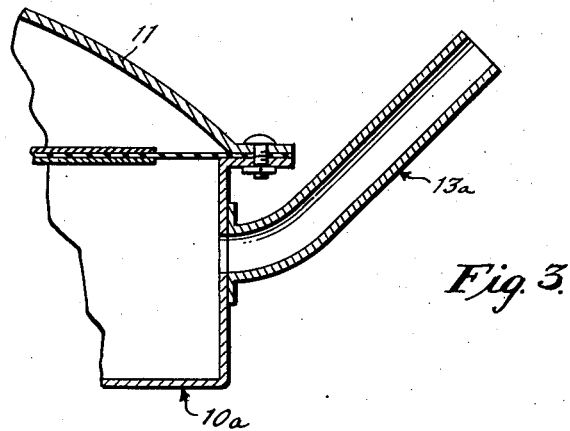
Figure 3 is a partial sectional elevational view showing a slightly modified embodiment of animal watering device according to the teachings of the present invention.

A slightly modified embodiment is shown in Figure 3, wherein a nipple 13a is connected a vessel 10a in substantially the same manner as the nipple 13 and vessel 10. However, the nipple 13a is not provided with a check valve, or a valve of any kind. In this embodiment, there is only a single outlet nipple 13a connected to the vessel 10a, so that the application of suction to the nipple cannot be dissipated or loss through any other possibly open nipple. Hence, the check valve is unnecessary for that purpose.

While the embodiments illustrated are of a generally cylindrical configuration, it is of course appreciated that the vessel may be of an elongate configuration providing for the provision of a plurality of nipples projecting outward from the vessel in side by side relation, rather than radially, or the vessel may assume other configurations, if desired. Also, it may be desirable to mount a watering device of the present invention in concrete or provide a protective barrier thereabout, all of which may be accomplished, as desired, without departing from the concept of the instant invention.

From the foregoing, it is seen that this invention provides an animal watering device which fully accomplishes its intended objects and is well adapted to meet practical conditions of manufacture, installation, maintenance and use.

Although the present invention has been described in some detail by way of illustration and example for purposes of clarity of understanding, it is understood that certain changes and modifications may be made within the spirit of the invention and scope of the appended claims.

What is claimed is:

1. An animal watering device comprising a closed chamber, a diaphragm in one wall of said chamber exposed on its outer side to the atmosphere for movement responsive to pressure changes on its inner side, an inlet connected to said chamber for passing water under pressure into said chamber, valve means in said inlet for opening and closing the latter, valve operator means connected between said diaphragm and valve means to open and close the latter upon diaphragm movement responsive to decreased and increased pressure, respectively, in said chamber, and an outlet nipple connected to said chamber and extending upward beyond the maximum water level therein to be sucked by an animal for removing water from said chamber, thereby decreasing the pressure in said chamber to effect opening of said valve means and the admission of additional water to said chamber.

2. An animal watering device according to claim 1, said inlet being connected to the chamber wall opposite to said one wall, and said operator means comprising a stem connected between said diaphragm and valve means for moving the latter upon movement of said diaphragm.

3. An animal watering device according to claim 1, in combination with an additional outlet nipple connected to said chamber to be sucked by an animal for removing water from said chamber, and a normally closed valve in each of said nipples and adapted to open upon the application of suction thereto, whereby suction may be applied to only one of said nipples to decrease the pressure in said chamber and effect opening of said valve means.

4. An animal watering device according to claim 1, in combination with adjustable stop means for selectively limiting the movement of said valve operator means to prevent closure of said valve means, thereby effecting leakage through said nipple for training animals to suck the nipple.

5. An animal watering device comprising a closed vessel, a diaphragm in one wall of said vessel exposed on its outer side to atmospheric pressure for movement responsive to pressure changes on its inner side, an inlet connected to said vessel opposite to said diaphragm for passing water under pressure into said vessel, a valve seat in said inlet, a valve element movable into and out of seating engagement with said valve seat on the side thereof remote from said diaphragm, a valve stem extending spacedly through said valve seat having its opposite ends respectively connected to said diaphragm and valve element for effecting movement of the latter upon movement of said diaphragm, resilient means normally urging said diaphragm outward to effect closure of said valve element, and an outlet nipple connected to said vessel and extending upward beyond the maximum water level therein to be sucked by an animal for removing water from said vessel, thereby decreasing the pressure in said vessel to cause movement of said valve element out of its closed relation by movement of said diaphragm inward against the force of said resilient means.

6. An animal watering device according to claim 5, in combination with a cover extending protectively over the exterior of said diaphragm and fixedly secured to said vessel, said cover having openings affording access of atmospheric pressure to the outer side of said diaphragm, said valve stem extending through and exteriorly beyond said diaphragm into said cover, and adjustable stop means carried by said cover and engageable with the external extension of said valve stem to selectively limit closing movement of said valve element and thereby effect leakage through said nipple for training animals to suck the nipple.

7. An animal watering device according to claim 5, in combination with an additional outlet nipple connected to said vessel to be sucked by an animal for removing water from said valve, and a normally closed valve in each of said nipples and adapted to open upon the application of suction thereto, whereby suction may be applied to only one of said nipples to decrease the pressure in said vessel and effect opening of said valve element.

References Cited in the file of this patent

UNITED STATES PATENTS

| | | |
|---|---|---|
| 2,445,359 | Meidenbauer | July 20, 1948 |
| 2,581,450 | Seeler | Jan. 8, 1952 |
| 2,672,124 | McCrary | Mar. 6, 1954 |

FOREIGN PATENTS

| | | |
|---|---|---|
| 719,025, | Great Britain | Nov. 24, 1954 |